United States Patent [19]

Feinberg et al.

[11] 4,327,164

[45] Apr. 27, 1982

[54] BATTERY SEPARATOR

[75] Inventors: Stewart C. Feinberg, Monroeville, Pa.; Christian B. Lundsager, Ashton, Md.; Joseph T. Lundquist, Jr., Columbia, Md.; Robert A. Balouskus, Sykesville, Md.

[73] Assignee: W. R. Grace & Co., New York, N.Y.

[21] Appl. No.: 172,400

[22] Filed: Jul. 25, 1980

Related U.S. Application Data

[63] Continuation-in-part of Ser. No. 37,721, May 10, 1979, abandoned.

[51] Int. Cl.$^3$ .............................................. H01M 2/16
[52] U.S. Cl. .................................... 429/144; 429/251; 429/254
[58] Field of Search ................ 429/144, 251, 252, 254

[56] References Cited

U.S. PATENT DOCUMENTS

| | | | |
|---|---|---|---|
| 3,351,494 | 11/1967 | Larsen et al. | 429/252 |
| 4,085,241 | 4/1978 | Sheibley | 429/254 |
| 4,224,393 | 9/1980 | Feinberg et al. | 429/254 |
| 4,226,926 | 10/1980 | Goldberg et al. | 429/254 |

*Primary Examiner*—Donald L. Walton
*Attorney, Agent, or Firm*—Howard J. Troffkin

[57] ABSTRACT

A battery separator, and a method of forming the same, which exhibits good electrical conductivity and a high degree of inhibition to dendrite formation, is in the form of a thin sheet formed from a substantially uniform mixture of a thermoplastic rubber, a filler, a rubber modifier, and a processing aid.

7 Claims, No Drawings

BATTERY SEPARATOR

CROSS REFERENCE TO RELATED APPLICATIONS

This application is a continuation-in-part of my application Ser. No. 37,721 filed May 10, 1979 and now abandoned.

BACKGROUND OF THE INVENTION

The subject invention is directed to battery separators which exhibit a high degree of conductivity and inhibition to dendrite formation and which are capable of being formed in an economically improved continuous manner.

Storage batteries, in general, utilize either acid or alkaline electrolyte with compatible electrode systems. The term "acid battery system" or "alkaline battery system", as used in the present application, refers to battery systems which utilize, respectively, an acidic or an alkaline solution as the electrolyte. An example of an acid battery system is lead acid batteries which are in common use, while examples of alkaline battery systems are those which use silver-cadmium or nickel-zinc electrodes in an alkaline solution such as an aqueous solution of potassium hydroxide.

Because of their high energy density, alkaline batteries, such as nickel-zinc secondary alkaline battery system, have great potential for replacing the more conventional lead acid battery system in a number of terrestrial applications. However, extending the cyclic life of the battery beyond that presently attainable and reducing the cost of the cell components are required criterias which must be met to make the alkaline battery system an effective energy source.

Battery separators are recognized as a key component in attaining an extended battery life and efficiency. Separators are located between plates of opposite polarity to prevent contact between the plates while freely permitting electrolytic conduction. Contact between plates of opposite polarity may be due to imperfections in the plate structure, such as warping or wrinkling of the plate. Such macro deformations are readily inhibited by any type of a sheet material which is coextensive with the plates and is capable of permitting suitable electrolyte passage. Contact may also occur by formation of dendrites or localized needle like growths on an electrode, such as zinc dendrites formed on the zinc electrode in an alkaline nickel-zinc battery system. Separators which are commonly used today are in the form of sheet structures which during formation normally have pores and imperfections of sufficient size to readily permit dendrites to bridge the gap between electrodes of opposite polarity and, thereby, short out the battery system and reduce the battery life.

Various non-elastomeric polymers have been used for forming separators. The term "elastomeric" or "elastomer", or "rubber", as used in the present application, refers to polymer materials which are capable of exhibiting a high degree of elongation and recovery. Elastomeric materials are distinguished from other polymeric materials, such as polyethylene, polypropylene, polystyrene and the like which are not capable of exhibiting such stress/strain recovery properties.

U.S. Pat. No. 3,351,495 teaches that certain non-elastomeric polyolefins, such as polyethylene and polypropylene, can be compounded with filler and plasticizer to form a sheet material which, after extraction of some or all plasticizer, forms a microporous matrix suitable as a battery separator. The required use of a high amount of plasticizer and the needed extraction step to form a suitable separator material is costly and, in certain instances, produces irregular results. Separators formed from polyolefins, such as polyethylene, have been irradiated in attempts to increase the structural integrity of the formed sheet material. The resultant crosslinked material, when used as a separator, have been observed to exhibit high electrical resistance and, therefore, generally detract from the formation of effective and efficient battery system.

More recently, certain rubber materials, including synthetic rubbers, have been used in the preparation of battery separators. These rubber materials are solvent cast onto a highly porous substrate support sheet which is normally formed from cellulose or asbestos material. The process of forming such composite separators is both complex and costly and requires removal of the casting solvent and extraction of plasticizer contained in the rubber to form a microporous membrane. Further, these separators are normally of a thickness which reduces the efficiency of the formed battery system.

A battery separator which is capable of increasing the efficiency of a battery system is highly desired. It is generally agreed such a separator should be in the form of a thin, microporous sheet which is resistant to degradation by electrolyte solution, exhibits a high degree of inhibition to dendrite formation and dendrite growth, and has a high degree of electrical conductivity. Further, the battery separator should be of a composition which is capable of being processed and formed into thin microporous sheet material in an efficient and cost effective manner.

SUMMARY OF INVENTION

The present invention is directed to battery separators which have high electrical conductivity, high inhibition to dendrite formation and growth, are resistant to degradation by common electrolyte solutions, and is readily formed in a cost effective, simple manner. The present separator is formed from a substantially uniform mixture of a thermoplastic rubber material, preferably a styrene/elastomer/styrene triblock copolymer, a filler which is essentially chemically inert to the electrolyte of the battery system in combination with a minor amount of rubber modifier and a processing agent. The mixture is capable of being formed into sheets of less than 10 mil thickness of a structure which permits good electrical conductivity and high inhibition to dendrite formation and growth.

DETAILED DESCRIPTION OF THE INVENTION

The subject invention is directed to the utilization of a combination of components which unexpectedly permits the formation of a battery separator having highly desired properties in a simple, cost effective manner, and to the process of forming the same. Specifically, the subject invention is directed to a composition of a thermoplastic rubber material in combination with an inert filler, a rubber modifier, and a processing agent, which has unexpectedly been found capable of forming a homogeneous mixture which can be processed in a continuous manner by standard calendering techniques and equipment to form the desired sheet material suitable as a battery separator.

The polymer matrix required for use in forming the subject separators are of the class of materials known as thermoplastic rubbers. The polymers are required to have an elastomeric segment which forms the major amount of the polymer chain. The elastomeric material generally has a glass transition temperature below room temperature and is substantially amorphous in morphology. The polymer chain further comprises a thermoplastic segment which has a glass transition temperature above 75° C. and, preferably above 100° C., and which forms a minor portion of the polymeric chain. The thermoplastic segments normally form end blocks of the polymer chain. The material can, therefore, be viewed as a block copolymer having a structure of thermoplastic/elastomer/thermoplastic polymer chains. Examples of such polymer materials formed of three block segments with an elastomeric block in the center of the polymeric chain and a thermoplastic block on each end are, for example, styrene/elastomer/styrene block copolymer. Such thermoplastic rubbers are commercially available, including materials sold under the tradename of Kraton by Shell Chemical Company.

The thermoplastic rubbers found useful in the present invention consist of triblock copolymers in which the mid-block of the molecule is an elastomer such as polybutadiene, polyisoprene, poly(ethylene-butylene) and the like. The mid-block segment should be present as the major weight percent of the triblock copolymer and have an average molecular weight which is sufficient to impart elastomeric rubber properties to the resultant copolymer. Such molecular weights are normally at least about 40,000. Elastomers of an average molecular weight of from about 40,000 to 100,000 are most suitable for the intended purpose.

The thermoplastic blocks form segments at each end of the elastomeric block to complete the triblock configuration of the subject thermoplastic rubber. The preferred thermoplastic rubber have end blocks formed from styrene. In lieu of styrene, the end blocks can be formed from other vinyl monomers which are capable of forming polymer segments which are thermodynamically incompatible with the elastomer segment while capable of imparting thermoplastic properties to the resultant rubber. Other monomers suitable for forming the end blocks include substituted styrene, such as alpha-methyl styrene, paraphenyl styrene, as well as acylonitrile and the like. The thermoplastic polymeric end groups should have a glass transition temperature of above about 75° C. and preferably above about 100° C. Each of the end blocks should have an average molecular weight between a lower limit set by the minimum chain size required for phase separation, while the upper limit is governed by the effect of viscosity on the efficiency of phase separation. In most instances, the average molecular weight of such end blocks are from about 5,000 to 25,000 and, preferably, from 10,000 to 20,000. In the case of polystyrene end blocks, it is preferred that the styrene content be up to about 40 weight percent of the triblock copolymer, as described herein.

The preferred thermoplastic rubbers to be used in the present invention are those of a block copolymer formed from styrene/elastomer/styrene wherein the elastomer is butadiene, isoprene or ethylene/butylene copolymers. The polystyrene concentration may range from about 15% to about 40% by weight such as to give the resultant polymer thermoplastic properties while allowing the polymer to retain the elastomeric properties attributable to the mid-block.

The thermoplastic rubber found useful in the subject invention have a melt index, as determined by the standard procedures indicated in ASTM D-1238 (Condition G), of less than about 10 gms/10 min. and have tensile strengths of from about 3,000 to 5,000 psi, a 300% modulus of elasticity of from about 10 to 900 psi, and elongation at break of from about 500 to 1,300 percent, as measured in accordance with ASTM method D-412.

The thermoplastic rubbers, as illustrated by styrene/elastomer/styrene, are generally prepared by anionic polymerization, preferably anionic solution polymerization using solvents, initiators, temperatures, and techniques which are well known to those skilled in the art. Four methods used for preparing block copolymers by anionic polymerization are applicable to preparing the thermoplastic elastomers used in this invention and are summarized as follows:

1. Sequential Polymerization—Styrene is first polymerized in preferably non-polar solvents, such as heptane or cyclohexane, using suitable alkyl lithium initiators, such as sec-butyl lithium or isopropyl lithium. After all the styrene has been polymerized, the elastomeric block may be initiated from the end of styrene block by addition of a suitable elastomer forming monomer, such as butadiene. In order to initiate the third (polystyrene) block after the elastomer has been consumed, a polar solvent can be added along with styrene. This method can be used in the preparation of triblock copolymer free of any homopolymer or diblock, provided rigorous exclusion of impurities is observed.

2. Difunctional Initiation—Polymerization of the desired elastomer, such as butadiene, is initiated by means of a dilithium initiator. Styrene monomer is added after formation of polystyrene block at each end of the elastomer.

3. Diblock Synthesis—A polystyrene-diene diblock copolymer is prepared in a manner similar to that described in Method 1 above. The active chain ends are then coupled using a coupling agent (e.g., dichlorodimethyl silane) to yield triblock material.

4. Two-Stage Process—Polystyrene is formed and followed by addition of a styrene-diene mixture whereby the elastomeric block is formed preferentially, followed by the polystyrene block.

Although not to be a limitation on the subject invention, it is believed that the thermoplastic rubbers of the subject invention, as illustrated by styrene/elastomer/styrene block copolymers, are capable of exhibiting both thermoplastic and elastomeric properties due to the thermodynamic incompatibility between the polystyrene thermoplastic moieties and the elastomer blocks contained in the rubber molecule and matrix. Because of this incompatibility, the polystyrene end blocks, being in a minor portion of the rubber matrix, unite to form submicroscopic regions or domains (about 300 to 400A) which are substantially uniformly distributed throughout the matrix. These domains create a crosslinking network of a physical nature. The continuous phase between and around the domains is occupied by the elastomeric moieties and imparts the rubber properties to the polymer material. The domains may be disrupted and, therefore, the physical crosslinking may be readily broken through the application of stress or elevated temperature or a combination of the same, and will depend upon the exact glass transition temperature of the resultant thermoplastic polymer. The subject thermoplastic rubbers have or exhibit two glass transition temperatures, one associated predominantly with the elastomeric moiety, and a second associated with the thermoplastic end blocks. For comparison, random copolymers of styrene and butadiene normally exhibit a single glass transition temperature.

The subject rubbers may be further enhanced by incorporating therewith an antioxidant, an antiozonant, or combinations thereof in conventional amounts and methods as is well known to those skilled in the art. Some antioxidants which have been found useful with respect to thermoplastic rubbers are, for example, zinc dibutyl dithiocarbamate, thiodipropionate, triphenyl phosphite and the like. Antiozonants, which are commercially available, include, for example, nickel dibutyldithiocarbamate, dibutylthiourea and the like.

The fillers may be any ingredient which is substantially chemically inert with respect to the electrolyte to which it is to come in contact. For example, the filler can be carbon black, coal dust, or graphite; it may also be a metal oxide or hydroxide such as those of silicon, aluminum, calcium, magnesium, barium, titanium, iron, zinc, and tin; it may also be a metal carbonates such as those of calcium, magnesium or the like; synthetic and natural zeolites; Portland cement; precipitated metal silicates, such as calcium silicate, and aluminum polysilicate; alumina and silica gels, or mixtures of said fillers.

When the separator material is contemplated for use as a component of an alkaline battery system, it is preferred that the filler material utilized be aluminum oxide, titanium dioxide, carbon, or combinations thereof. If the battery separator is contemplated for use as a component of an acid battery system, the filler material may include silicon compounds, such as silicon oxide, silica gels, polysilicates, and the like. The volume ratio of thermoplastic rubber polymer to filler should be between 10:1.5 and 10:6 and, preferably, between 10:2.5 to 10:4. Generally, the size of the filler particle can range from an average of about 0.01 micron to about 10 microns in diameter and, preferably, from about 0.01 to 0.25 microns. The surface area of the filler can range from about 10 to 950 square meters per gram, as determined by standard techniques.

The above described thermoplastic rubber and filler materials are to be used in combination with minor amounts of an organic additive which modifies the thermoplastic or viscoelastic properties or both of the thermoplastic rubber. The additional material should be present in amounts of from 2 to not greater than 10 percent and, preferably, from 2 to 5 percent by weight, based on the total weight of the resultant composition. In order to further enhance the viscoelastic properties of the subject thermoplastic rubber, one may utilize an additional material which will associate with the elastomeric phase of the matrix. The thermoplastic or high temperature performance of the rubber may be modified by ingredients which will associate with the thermoplastic phase or domains of the matrix. For example, elastomer associated materials are low molecular weight polymers, such as polyisobutylene, polybutadiene, ethylene-propylene copolymers, polyterpenes and the like, as well as compounds containing ester groups therein. The thermoplastic properties of the subject polymer can be modified by the addition of compounds which will associate with the thermoplastic moiety, such as polystyrene, poly(alpha-methylstyrene), and the like.

The composition of the present invention further requires the utilization of an agent selected from metal stearates, stearic acid, oleic acid, or natural and synthetic waxes. The waxes may be microcrystalline, paraffins, waxes, stearamides, ester waxes and the like. The preferred agents are stearic acid and its metal salts, such as alkali and alkaline earth metal salts of stearic acid. The subject agent should be present in the formed composition in from about 0.5 to 5 weight percent based on the total weight of the resultant composition. The addition of the above described agent has been found to cause the formation of a resultant composition which can be readily processed in a continuous manner, as described herein below.

The components of the instant composition can be mixed by any conventional manner which will produce a substantially uniform distribution of the filler, modifier and processing agent throughout the polymer matrix. Mixing temperatures of up to about 175° C. and preferably, from about 70° to 150° C. are suitable for processing the compounds to be utilized in the instant invention. At such elevated temperatures, the polymeric matrix is softened sufficiently to be handled as a thermoplastic material. Time of mixing should be sufficient to produce a particularly uniform mixture with times of from about 5 to 30 minutes being satisfactory. The components can be premixed at room temperature in a blender or the like, and then fed to a heated mixer, such as an internal mixer of the Banbury type or the like which are suitable compounding processors.

It has been unexpectedly found that the subject composition can be readily formed into a thin battery separator sheet material having high electrical conductivity and inhibition to dendrite formation by continuous processing technique using conventional equipment. The subject process requires the compounding of the required components of the subject composition, as described herein above, to form a substantially uniform mixture of the components. This can be done by utilizing an internal or screw type mixer. In some instances, it has been found preferable to further mix the resultant composition by application of a two roll mill which is capable of subjecting the composition to high shear force causing additional mixing and formation of an additional sheet or slab of the composition.

The two roll mill should generally be heated to temperatures sufficient to cause the thermoplastic rubber matrix to soften sufficiently to cause additional uniform mixing of the components. Such temperatures are generally from 50° to 100° C. The sheet product which is formed can be directly used as the feed for the forming operation to produce the desired separators.

The substantially uniformly mixed composition, either from the compounder or the mill, is then formed into the desired thin sheet product by subjecting the composition to high shear forces and at elevated temperatures and/or pressures. It has been unexpectedly found that thin sheet material of less than 10 mils and, preferably, less than 5 mils in thickness can be readily formed in this manner. For example, conventional calendering apparatus can be used which have a multinip configuration such as a four roll/three nip calendering apparatus can be used to impart the necessary shear force. The calendering rollers can be maintained at an elevated temperature with temperatures of from 50° to 150° C. being preferred.

The presently described composition has been unexpectedly found to be capable of being formed into thin sheet material suitable for use as a battery separator in a continuous manner using conventional equipment, such as calendering and the like. This ability permits ready formation of the desired separator in a cost-effective manner.

The term "sheet" is intended in the subject application to define a planar material which may or may not contain, in addition, rib embossing or patterns. The sheet material should be of a film which is generally less than about 10 mils thick and, preferably, less than 5 mils in thickness. The ribs or webs, as part of the configuration of acid battery system separators, may add to this thickness.

It has been unexpectedly found that the sheet material formed in accordance with the present invention can be readily superimposed upon an additional sheet material of like kind so as to form a composite sheet material of less than 10 mils thick. Due to the nature of subject composition, the resultant films adhere to one another solely due to the adhesive nature of the materials. The composite sheet material can be formed from sheets of the same or different thermoplastic rubber matrix. In the former preferred case, the resultant composite sheet will be of a substantially uniform composition throughout the formed separator. By utilizing a multiplicity of the subject sheet materials, one attains a composite sheet which alleviates any effect of pinholes that may occur during the formation of the separator sheet. Such pinholes normally permit ready growth of dendrites and the shorting out of the battery system resulting therefrom.

The final composition of the separator will be substantially the same as and defined by the rubber, filler, modifier and processing agent used to form the initial composition.

Although highly filled thermoplastic rubbers have previously been used in forming sheet material by batch methods, such as by the utilization of a heated press or the like, such compositions do not permit the formation of the desired sheets in a continuous manner. The presently described composition formed from the combination of components has been unexpectedly found capable of forming a sheet material without the conventional processing step of extraction or removal of the plasticizer, oil or solvent contained therein. Further, the resultant composition is capable of forming thin sheet material suitable as a battery separator in a continuous, cost effective manner.

The resultant sheets formed from such compositions have been found to be substantially absent of pores. Even though the sheet material, as formed, lacks pores as observed by electron mircroscopy and other conventional techniques, it has been unexpectedly found that they exhibit a high degree of electrical conductivity when in association with an acid or alkaline battery system. Battery separators formed from the above described compositions are believed to inhibit growth of dendrites and the resulting shorting out of the system while permitting a high degree of electrical conductivity by certain physical interaction between the electrolyte and the composition. This interaction, though unresolved, may be in the form of swelling, shrinking, wicking, etc. which causes only minute tortuous pores once the separator is in contact with electrolyte solution and, thus, permits passage of electrolyte ions to pass therethrough.

The thickness of the battery separators will vary, depending upon the type of battery in which they are used. The subject composition can be utilized to form both lead acid batteries and alkaline battery separator materials. In general, the thickness of web sheet material can range for 1 to 50 mils, as is useful in lead acid batteries systems. For alkaline batteries, the preferred thickness is generally less than 10 mils thick. The lead acid batteries can be made of a web sheet material to be used alone or in combination with a thin, from about 1 to 10 mils thick, sheet material. For the alkaline battery systems, either a single sheet of material or a plurality of sheets of material can be utilized to form a unitary sheet capable of inhibiting the formation and growth of dendrites. between electrodes of opposite plurality.

In order to be commercially acceptable, a battery separator must meet minimum electrical resistant requirements. Generally, the acceptable value is less than about 100 ohm-cm and, preferably, less than 20 ohm-cm, as measured by standard techniques.

Further, the battery separator should possess certain chemical properties such as resistance to oxidation and resistance to attack by acid or alkaline material, as is appropriate for the particular battery separator system. It has been found that the presently formed battery materials are capable of retaining their configuration and are not destroyed when placed in contact with alkali or acid materials over an extended period of time.

The following examples are given for illustrative purposes only and are not meant to be a limitation on the subject invention except as made in the claims appended hereto. All parts and percentages are by weight unless otherwise indicated.

EXAMPLE I

A battery separator sheet product was formed by initially compounding in a Banbury internal mixer 41 parts of a commercially available styrene/butadiene/styrene triblock copolymer crumb material which is free of plasticizer and oil, has a melt index of 6 gm/10 min (Condition G), a density of 0.94 gm/cc, a styrene to butadiene ratio of 28 to 72, and a Brookfield viscosity (25 wt % in Toluene) of 1,200 cps at 25° C., with 47 parts of a commercial $TiO_2$ powder having a surface area of 65 $m^2$/gm, and a density of 4.3 gm/cc, with 10 parts of a low molecular weight polyester condensation product of azelaic acid and propandiol (density $\cong 1$), and with 2 parts of stearic acid. The materials were mixed at 60 RPM at a maximum temperature of 95° C. for a period of about 6 minutes. The product was a substantially homogeneous mixture.

The resultant composition was further mixed by multiply passing it through a 2 roll mill mixer having 8 inch diameter by 16 inch length roller. The rollers were maintained at 65° C. The resultant sheet freely separated from the rollers of the mill mixer to give a sheet product which released from the rollers easily and was then subjected to calendering by passing the thick sheet product through a 3 roll "Z" calender having 8 inch dia. by 16 long rolls. The rollers were progressively maintained at from 63° to 93° C. and at from 5 to 9 feet per min. A sheet product was formed which was of continuous length, had a cross-sectional thickness of about 4 mils, and was substantially free of voids and pinholes. The material was readily removable from the rollers even though the sheet material was highly tacky.

Observation of random samples of the sheet product with respect to its surface and cross-sectional area were done by electron microscopy and by standard density determinations. Both techniques showed the material to be substantially free of voids and pores.

The films were utilized as separators in nickel-zinc alkaline secondary battery system (electrolyte:KOH).

The electrical resistance of the films was determined by the direct current method, as described by J. J. Lander and R. D. Weaver in *Characteristic of Separators for Alkaline Silver Oxide-Zinc Secondary Batteries:Screening Methods*, ed. by J. E. Cooper and A. Fleincher, Chapter 6. Resistance to dendrite penetration was measured according to the method described by G. A. Dalen and F. Solomon, Chapter 12, ibid. Prior to any testing, the films were conditioned subjection to 45 weight percent KOH solution at 100° C. for 90 minutes. Physical properties of molulus of elasticity (psi $\times 10^{-3}$) and elongation at break of the resultant sheets were tested in accordance with ASTM-638 procedure using a rate of elongation of 0.2 in./min. and an initial jaw separation of 0.4 in. prior to contact with KOH solution and subsequent soaking in 45 weight percent KOH solution at 80° C. for 96 hours.

In accordance with the above tests procedures, the electrical resistance of the resultant sheet material was determined to be 14 ohm-cm; zinc dendrite resistance was 10.2 min/mil thickness.

For comparative purposes, formation of separator sheet product, in accordance with the above process and components, was attempted except that the stearic acid component was not used. No acceptable product was formed in this manner. Further, attempts to form separator sheet product by varying the temperature up to about 110° C. or by using a 4 roll/3 nip "Z" calender also failed to readily product the desired product.

EXAMPLE II

A separator sheet product was formed in accordance with the procedures and components described in Example I above, except that the amounts of components were: 40 parts styrene/butadiene/styrene; 55 parts TiO$_2$ filler; 3 parts polyester, and 2 parts stearic acid.

The components were mixed in a Banbury mixer at 150 RPM with maximum temperature of 110° C. The composition was further mixed using a 2 roll mixer with a sheet product being formed and released easily. The initially formed sheet was fed to a 3 roll/2 nip, 2 configuration calender in which the rolls were progressively maintained at 80° to 102° C. with roll speeds of from 3.5 to 6 feet per min. A sheet product of 3 mil thickness was formed which was free of voids and which was observed, by electron microscopy, to be free of pores both on its surface and cross-section.

The product was used as separators in an alkaline Ni-Zn battery system and upon testing exhibited electrical resistance of 8.5 ohm-cm, 7.2 min/mil dendrite resistance, Young's Modulus of 2.7 and 45 (psi $\times 10^{-3}$) before and after KOH treatment and elongation at break of 580 and 17%.

For comparative purposes, the formation of separator sheets were attempted in accordance with the above procedures and components, except that either no, or only 1 part, polymer modifier was used. The compositions used by the above described process were not capable of forming sheet products.

EXAMPLE III

A separator sheet product was formed using the procedures and components described in Example I above except that 29 parts of the above-described triblock copolymer was used in combination with 16 parts of a commercially available styrene/butadiene/styrene having a styrene to butadiene ratio of 30:70, a melt index of 1 gm/10 min, a density of 0.94 gm/cc, and a Brookfield viscosity (25 wt. % in Toluene) of 4,000, with 3 parts of the polyester and 0.5 parts of stearic acid.

The Banbury mixer conditions were: blade speed of 150 RPM, maximum temperature of 144° C., and mixing time of 5 minutes. The rolls of the two roll mixer were maintained at 133° C.; the conditions of the 3 roll/2 nip "Z" calender were progressively 110° to 120° C. at roll speeds of from 3.5 to 7 ft per min.

The sheet product formed had electrical resistance of 18.4 ohm-cm, dendrite resistance of 18 min/mil, a Young's Modulus of 3 and 23 psi $\times 10^{-3}$ (before and after KOH), and elongation at break of 640 and 21 percent before and after KOH, respectively.

EXAMPLE IV

A separator sheet product was formed in accordance with the procedures described in Example I above, except that the stearic acid was substituted for an equal amount of zinc stearate. The material easily formed into a continuous sheet product by calendering and did not exhibit hang-up or sticking to the calender rolls.

The resultant sheet product was cut into sections to be used in an alkaline Ni-Zn secondary battery system and was tested in accordance with the procedures indicated in Example I above. The separator exhibited an Electrical Resistance of 9.5 ohm-cm, a dendrite resistance of 8 min/mil.

EXAMPLE V

Separator sheet products were formed in accordance with the procedure described in Example I above using (Sample I) 50 parts of the thermoplastic rubber described in Example I, with 45 parts of a commercially available MgO powder having a surface area of 64 m$^2$/gm, and a density of 3.5 gm/cc, with 3 parts of the polyester and 2 parts of zinc stearate, or by using a commercially available styrene/butadiene/styrene triblock copolymer having a styrene:butadiene ratio of 30/70, a density of 0.94 gm/cc, a melt index of less than 1 (Condition G), and a Brookfield viscosity (25 wt. % in Toluene) of 4,000 cps at 25° C. with the same added ingredients. The material was easily formed into a continuous sheet product by calendering and did not exhibit hang-up or sticking to the forming apparatus.

The resultant sheet products were less than 10 mil thick and were cut into sections to be used in an alkaline Ni-Zn secondary battery system, and were tested in accordance with the procedures indicated in Example I above. The samples, on observation by electron microscopy, showed both the surface and cross-section to be substantially free of pores.

Sample I exhibited electrical resistance of 13 ohm-cm, dendrite resistance to 20 mil, Young's Modulus before and after hot KOH treatment of 21 and 3, respectively, and elongation at break of 550 and 140 percent before and after KOH treatment.

Sample II exhibited electrical resistance of 28 ohm-cm, good dendrite resistance, and physical properties (before and after hot KOH treatment) of 64 and 14 for Young's Modulus, and 90 and 590 for percent elongation at break.

While the invention has been described in connection with certain preferred embodiments, it is not intended to limit the invention to the particular form set forth, but, on the contrary, it is intended to cover such alternatives, modifications, and equivalents, as defined by the appended claims.

What is claimed is:

1. A battery separator having high electrical conductivity and inhibition to dendrite formation comprising a sheet formed from a substantially uniform mixture of a thermoplastic rubber, an inert filler having an average particle size ranging from about 0.01 to 10 microns, a thermoplastic rubber modifier and a processing agent selected from stearic acid, stearic acid metal salts, stearic acid amides, and natural or synthetic waxes; said thermoplastic rubber to filler being present in a volume ratio of from 10:1.5 to 10:6 and the weight percent, based on the total mixture, of said rubber modifier is from 2 to 10 weight percent and of said processing agent is from about 0.5 to 5 weight percent.

2. The separator of claim 1 wherein the thermoplastic rubber is a styrene/elastomer/styrene triblock copolymer having styrene present in from about 15 to 40 weight percent.

3. The separator of claim 2 wherein the thermoplastic rubber is selected from styrene/butadiene/styrene, styrene/isoprene/styrene, styrene/ethylene-butylene/styrene; the number average molecular weight of the elastomeric segment being from about 40,000 to 100,000 and the styrene end blocks being from 10,000 to 20,000.

4. The separator of claim 2 wherein the filler is selected from a metal oxide or hydroxide or mixtures thereof.

5. The separator of claim 4 wherein the filler is selected from magnesium oxide, titanium dioxide or aluminum oxide or mixtures thereof.

6. The separator of claim 4 wherein the filler is selected from magnesium oxide, titanium dioxide or aluminum oxide or mixtures thereof; the rubber modifier is selected from polymeric low molecular weight polyolefins, polyesters, polyterpenes, polystyrenes, and monomeric ester; and the processing agent is selected from stearic acid or a metal stearate.

7. The separator of claim 6 wherein the separator is of a laminate structure of more than one sheet, said structure having a thickness of less than 10 mils.

* * * * *